United States Patent [19]

Pausche

[11] 4,037,812
[45] July 26, 1977

[54] ADAPTABLE ENCLOSURE MOUNTING SYSTEM

[75] Inventor: John William Pausche, Norridge, Ill.

[73] Assignee: Motorola, Inc., Schaumburg, Ill.

[21] Appl. No.: 609,263

[22] Filed: Sept. 2, 1975

[51] Int. Cl.² .................................... F16M 13/02
[52] U.S. Cl. ........................... 248/218.4; 248/220.2; 248/231.1
[58] Field of Search ............... 248/221, 220.5, 223, 248/121, 203; 85/73, 74

[56] References Cited

U.S. PATENT DOCUMENTS

| | | | |
|---|---|---|---|
| 936,527 | 10/1909 | Fisher | 248/223 |
| 1,088,324 | 2/1914 | Corkhill | 248/221 |
| 1,688,400 | 10/1928 | Simpson | 248/203 |
| 1,964,871 | 7/1934 | Cook | 248/221 |
| 2,689,102 | 9/1954 | Waalen | 248/230 |
| 3,104,122 | 9/1963 | Daniels | 248/221 |
| 3,198,465 | 8/1965 | Sutton | 248/221 |
| 3,241,800 | 3/1966 | Richter | 248/221 |
| 3,408,028 | 10/1968 | Raymond | 248/221 |
| 3,421,404 | 1/1969 | Jacobs | 85/73 |

FOREIGN PATENT DOCUMENTS

| | | | |
|---|---|---|---|
| 1,277,695 | 10/1961 | France | 85/73 |
| 2,018,117 | 4/1971 | Germany | 85/73 |
| 1,106,758 | 3/1968 | United Kingdom | 85/73 |

Primary Examiner—Robert A. Hafer
Attorney, Agent, or Firm—Margaret Marsh Parker; James W. Gillman

[57] ABSTRACT

A support system, for mounting enclosures on hollow poles of the type located on a highway right-of-way and having a range of diameters and wall thicknesses, has a bracket plate which is fastened to the back of the enclosure with mounting subassemblies inserted through holes in the bracket and in the pole wall. Each subassembly comprises a slotted expandable tube, a locking bolt and a special nut. Interaction of the nut and bolt cause expansion of the tubular member, locking the bracket to the wall of the pole. Also in the bracket and aligned with each subassembly, are two angled, threaded apertures which retain stabilizing screws. Subsequent to the locking action, the screws are advanced into forceful contact with the exterior of the pole wall. An enclosure back portion is then mounted on the bracket by hexagonal head bolts or the like, the heads of the bolts being seated in hexagonal depressions in the rear of the brackets for inaccessability from the outside of the cabinet. The bracket configuration includes a number of mounting holes to make it usable with various enclosure designs. The complete enclosure can then be closed with a key lock or equivalent.

6 Claims, 5 Drawing Figures

U.S. Patent  July 26, 1977  4,037,812
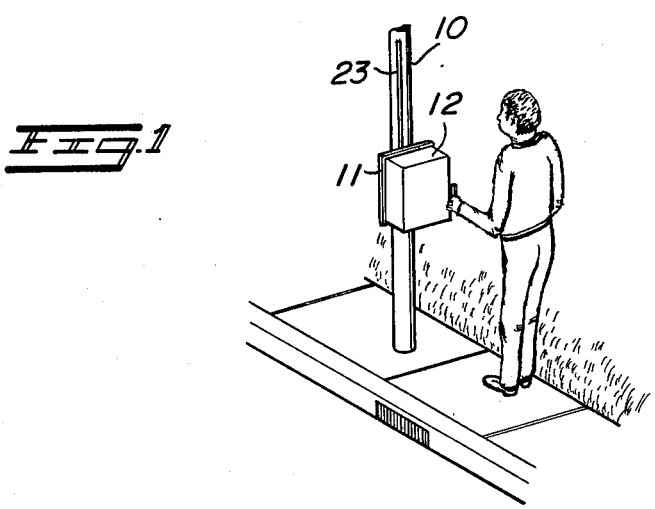
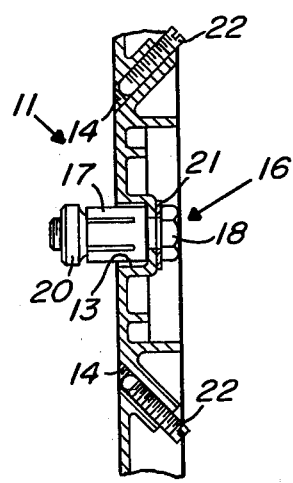
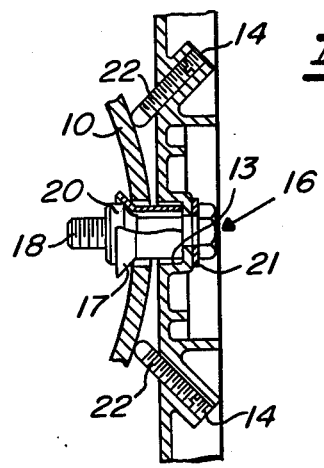
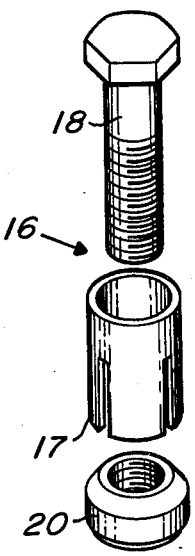
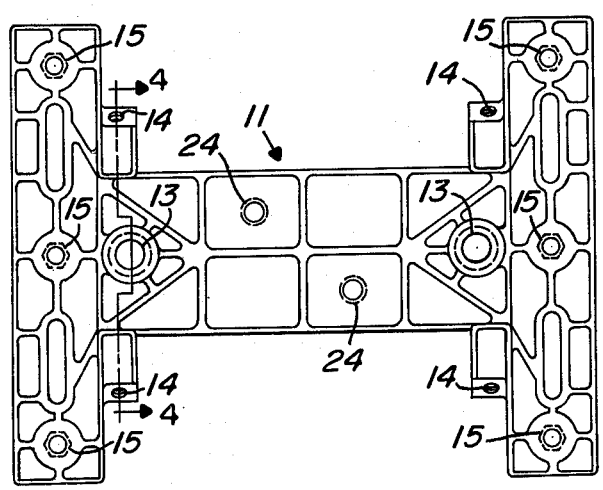

ADAPTABLE ENCLOSURE MOUNTING SYSTEM

BACKGROUND OF THE INVENTION

This invention relates to the field of mounting devices and in particular to the mounting of equipment enclosures and the like on hollow, typically vertical, poles. In most prior art devices for mounting cabinet-type equipment on hollow poles, the devices had to be different for each pole size and different for each piece of equipment. Also, most such devices utilized mounting straps, rings or cables which made the equipment vulnerable to theft when mounted for access from the ground. Since easy access can be an essential requirement, as in the case of emergency communication equipment along a highway right-of-way, theft prevention becomes particularly important. Rigidity of mounting also is particularly important when the equipment location is exposed to high winds. Many prior art mounting devices for use on hollow poles required apertures of specialized shapes which are difficult to provide in poles already mounted by the roadside.

SUMMARY OF THE INVENTION

It is, therefore, an object of the present invention to provide, for cabinet-type equipment to be mounted on a hollow pole, an improved mounting assembly which is resistent to unauthorized disassembly.

It is a more specific object to provide such a mounting assembly easily adaptable to a wide range of pole diameters and to a variety of pieces of equipment and also easy to install on-site.

It is another specific object to provide such an assembly with improved wind resistance.

In the mounting assembly according to the present invention, the above objectives are achieved by means of a bracket plate which is adaptable for use on poles having diameters ranging from only a few inches to an infinite diameter (flat wall) as a limit and with various pieces of equipment. The pole is easily prepared by drilling one or more vertically aligned, round apertures, at the appropriate height. The bracket is fastened to the pole by means of one or more slotted tubular members which fit into cylindrical cavities in the bracket. A bolt is inserted through a hole in the bottom of each cavity and through a tubular member to mate with a specially shaped nut. When the bracket is in place, the tubular members, bolt ends, and nuts extend through the prepared apertures in the wall of the mounting pole. When the bolts are advanced into the nuts, the slotted ends of the tubular members are forced to expand inside the hollow pole, thus fastening the bracket rigidly to the pole. To prevent "rocking" of the bracket, screws are advanced through angled bores in the bracket into forceful contact with the exterior of the hollow pole. The back of the enclosure is mounted to the bracket by bolts which cannot be removed without opening the enclosure. After the enclosure is completely assembled, it can be locked by any suitable means.

BRIEF DESCRIPTION OF THE DRAWING

FIG. 1 illustrates a typical application of the invention.

FIG. 2 is a plan view of a mounting bracket according to the invention.

FIG. 3 is an exploded view of an embodiment of a mounting subassembly.

FIG. 4 is a partial section of the bracket of FIG. 2 taken along the line 4—4, with the subassembly of FIG. 3 inserted and with stabilizing screws in place.

FIG. 5 is the same partial section of the bracket as in FIG. 4, shown fastened to a section of a portion of a hollow pole.

DESCRIPTION OF A PREFERRED EMBODIMENT

The invention can best be understood by referring more particularly to the drawing in which like parts have the same reference characters throughout. FIG. 1 shows a typical site for an installation of a mounting assembly according to the invention. A hollow metal pole 10, along a roadside, supports a bracket plate 11 to which is attached an enclosure 12 which might be the housing of an electronic emergency communication transmitter.

FIG. 2 shows the bracket plate 11 which would, in the preferred embodiment, be a strong, rigid cast, or otherwise formed, plate of a material such as aluminum. Integrally formed with the plate 11 are cylindrical cavities 13, angled threaded bores 14 and enclosure mounting holes 15. The function of these features will be explained hereinafter.

FIG. 3 shows a mounting subassembly designated generally as reference numeral 16, which comprises at least a slotted tubular member 17, a threaded bolt 18 and a special nut 20, and may include some type of washer 21 (as in FIGS. 4 and 5). In FIG. 4, a partial section of the plate 11 is shown with the mounting assembly 16 inserted in one of the cylindrical cavities 13. Also shown are two of the angled threaded bores 14 with a mating screw 22 inserted in each bore. In FIG. 5, the section of FIG. 4 is shown following attachment to a partial section of the wall of the pole 10. The bolt 18 has been rotated to cause the bolt to advance into the nut 20. The shape of the nut 20 is angled so as to cause the tubular member 17 to expand at its rearward, slotted end 17, thereby locking the bracket 11 to the pole 10. Also in FIG. 5, the screws 22 have been rotated within the threaded angled bores 14 to produce stabilizing contact with the pole.

In a typical application of the invention, an existing hollow roadside pole could be utilized by merely drilling the required number of holes, typically two, through the pole wall to allow passage of the tubular members with a snug fit. The bracket plate 11 with a subassembly 16 in place as shown in FIG. 4 is placed against the pole and the bracket plate is attached to the pole as described hereinbefore. The screws 22 are advanced into contact with the pole to provide stabilization.

A portion of the enclosure, typically the back, is fastened to the bracket plate by means of the mounting holes 15. Bolts, hexagonal head, for example, are inserted through the mounting holes 15 from the rear and through corresponding holes (not shown) in the enclosure, with the heads not projecting beyond and preferably recessed into the rear surface of the bracket plate. Nuts and lock washers as desired (not shown) are used to fasten the enclosure portion to the bracket plate 11. The remainder of the enclosure which, in the preferred embodiment, is unitary and contains the electronic equipment, may be fastened to the mounted portion in any desired manner and secured, as with a key-operated lock. Additional weather protection for cable entry holes of the enclosure 12 (not shown) may be obtained by bringing the cables 23 into the enclosure through shielded holes 24 in the bracket plate 11.

I claim:

1. An adjustable mounting assembly for attaching a lockable equipment enclosure or the like to a hollow pole, the pole having at least one aperture in a wall, the assembly comprising:

a bracket means having at least one cylindrical cavity formed in the back surface thereof, each cavity having in the bottom thereof an aperture smaller in diameter than the cavity, the bracket means having at least one mounting aperture and the bracket means having at least one threaded bore on each side of the vertical center line thereof, the longitudinal axis of each bore being angled from front to rear toward said vertical center line a the cylindrical cavity aperture, the mounting apertures, and the front openings of the threaded bores being positioned for being covered by a portion of the attached enclosure;

screw means for mating with each angled bore and adapted to being advanced within the bore into contact with the exterior of the hollow pole;

at least one subassembly for attaching the bracket to the pole, each subassembly comprising:

a tubular member having an outside diameter less than the inside diameter of the cylindrical cavity of the bracket means, having a length substantially greater than the depth of the cylindrical cavity and having a plurality of slots formed therein extending from one end of the member and along a substantial portion of the longitudinal dimension of the member;

a threaded bolt insertable in the tubular member, having a body diameter smaller than the aperture in the bottom of the cylindrical cavities, and having the longitudinal dimension of the body portion longer than the length of the tubular member;

a threaded member adapted to mate with the bolt and having a first portion of an outside diameter less than the inside diameter of the tubular element, having a second portion of a diameter substantially larger than the first portion, and having a third, tapered portion, joined to and connecting the first and second portions; and wherein the apertures in the pole are dimensioned to provide a close fit for the second portion of the threaded member, whereby subsequent to installation of the subassemblies in the cylindrical cavities of the bracket means and insertion through the apertures in the hollow pole, rotation of the bolts will cause the bolts to advance within the threaded member, causing the slotted ends of the tubular members to expand, locking the bracket to the hollow pole.

2. A mounting assembly according to claim 1 wherein there are two cavities spaced apart on the vertical center line and there are two threaded bores in horizontally spaced apart relation with and on each side of each of the cylindrical cavities.

3. A mounting assembly according to claim 1 wherein the bracket means is further adapted to being fastened to a range of different enclosures.

4. A mounting assembly according to claim 1 wherein the assembly further includes at least two enclosure mounting bolts, and wherein the bracket means further includes at least two integrally cast mounting holes for receiving the mounting bolts and a recess surrounding each mounting hole on the rear side of the bracket means for receiving one of the bolt heads in a snug fit, whereby a portion of the lockable enclosure having corresponding mounting holes may be attached to the bracket means and the mounting bolts are not removable while the enclosure remains locked.

5. A mounting assembly according to claim 1 wherein the bracket means is a unitary metal casting.

6. A mounting assembly according to claim 5 wherein the casting is constructed of an aluminum alloy.

* * * * *